(12) United States Patent
Kurth

(10) Patent No.: US 8,136,772 B2
(45) Date of Patent: Mar. 20, 2012

(54) DEVICE FOR RECEIVING OBLONG OBJECTS

(75) Inventor: Martin Kurth, Weil am Rhein-Ötlingen (DE)

(73) Assignee: A. Raymond et Cie, Grenoble (FR)

( * ) Notice: Subject to any disclaimer, the term of this patent is extended or adjusted under 35 U.S.C. 154(b) by 887 days.

(21) Appl. No.: 10/584,872

(22) PCT Filed: Feb. 24, 2005

(86) PCT No.: PCT/EP2005/001910
§ 371 (c)(1),
(2), (4) Date: May 11, 2009

(87) PCT Pub. No.: WO2005/095837
PCT Pub. Date: Oct. 13, 2005

(65) Prior Publication Data
US 2009/0212172 A1    Aug. 27, 2009

(30) Foreign Application Priority Data
Mar. 16, 2004  (DE) .......................... 10 2004 013 010

(51) Int. Cl.
*F16L 3/08* (2006.01)
(52) U.S. Cl. .................... 248/74.3; 248/68.1; 174/72 A; 174/68.3
(58) Field of Classification Search ................ 174/68.3, 174/72 A, 97; 248/68.1, 73; 16/2.5
See application file for complete search history.

(56) References Cited

U.S. PATENT DOCUMENTS

| | | | |
|---|---|---|---|
| 3,090,826 A | | 5/1963 | Cochran |
| 3,634,608 A | * | 1/1972 | Buhl et al. ................ 174/153 G |
| 4,564,163 A | * | 1/1986 | Barnett ........................... 248/71 |
| 4,609,171 A | * | 9/1986 | Matsui .......................... 248/74.3 |
| 4,669,688 A | * | 6/1987 | Itoh et al. ..................... 248/74.2 |
| 4,864,082 A | * | 9/1989 | Ono et al. ........................ 174/97 |

(Continued)

FOREIGN PATENT DOCUMENTS

DE          9109806 U1     11/1991

(Continued)

OTHER PUBLICATIONS

International Search Report PCT/EP2005/001910 (International Publication No. WO 2005/095837 A1; published Oct. 13, 2005).

*Primary Examiner* — Terrell McKinnon
*Assistant Examiner* — Daniel J Breslin
(74) *Attorney, Agent, or Firm* — Tarolli, Sundheim, Covell & Tummino LLP

(57) ABSTRACT

The device for receiving oblong objects comprises a bottom wall (2) and a receiving element (1) having two bordering walls (3, 4) facing each other. A cover element (16) is mounted on the receiving element (1) so as to be pivoted by means of a border hinge (15) and can be linked with the receiving element (1) by means of a closure system (23, 24, 25, 26) facing the border hinge (15). The cover element (16) has at least three cover sections (17, 19, 21). Between adjacent cover sections (17, 19, 21), a center hinge (18, 20) is configured. The closure system (23, 24, 25, 26) allows for a number of closure positions that corresponds to the number of center hinges (18, 20) and in which the cover sections (17, 19, 21) are spaced apart from the bottom wall at different distances. The same design of the inventive device can therefore be used in different environments of assembly.

18 Claims, 5 Drawing Sheets

U.S. PATENT DOCUMENTS

Figure 1:
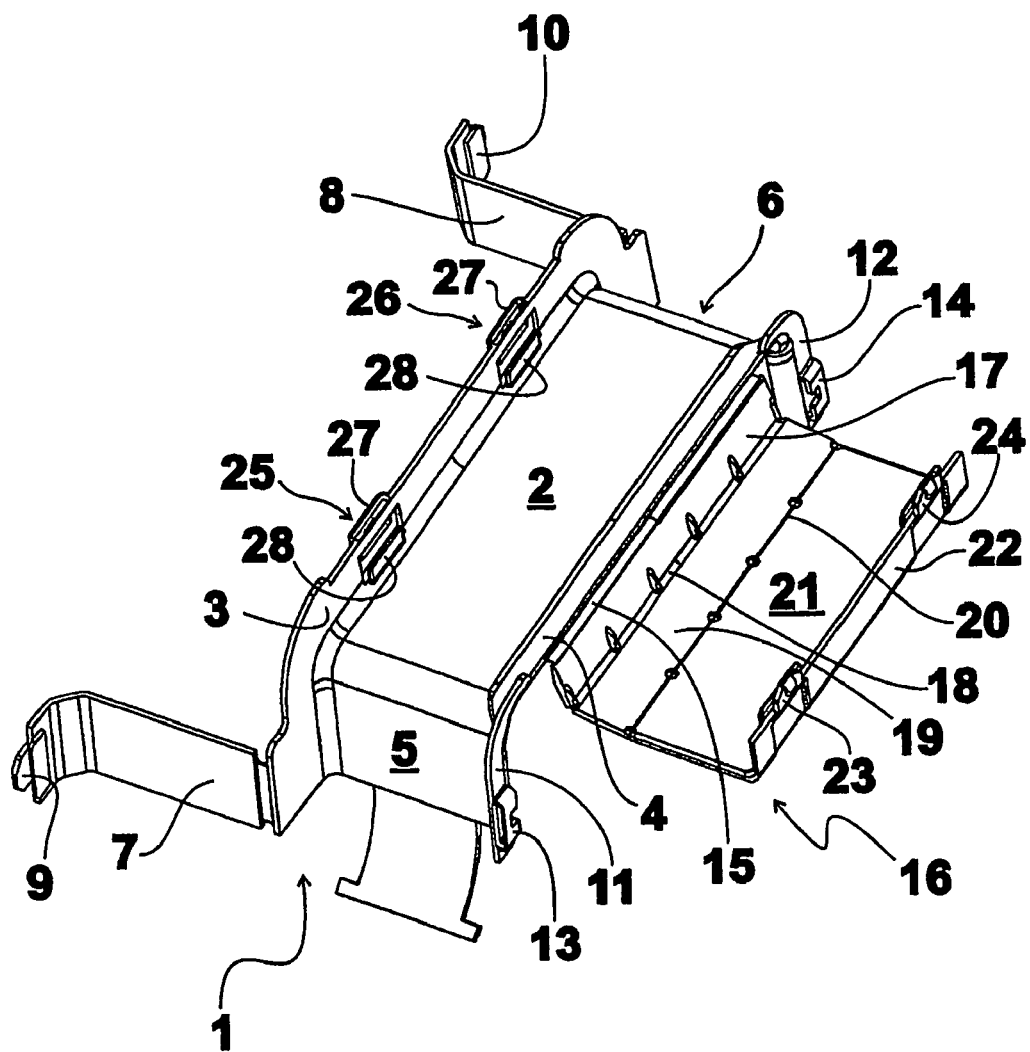

| | | | |
|---|---|---|---|
| 5,003,129 A * | 3/1991 | Toyomasu et al. | 174/69 |
| 5,060,810 A * | 10/1991 | Jones | 211/59.4 |
| 5,234,185 A * | 8/1993 | Hoffman et al. | 248/56 |
| 5,564,672 A | 10/1996 | Matson | |
| 5,749,609 A * | 5/1998 | Steele | 285/226 |
| 6,084,180 A * | 7/2000 | DeBartolo et al. | 174/95 |
| 6,164,603 A | 12/2000 | Kawai | |
| 6,209,827 B1 * | 4/2001 | Kawai | 248/73 |
| 6,314,229 B1 * | 11/2001 | Sasaki et al. | 385/135 |
| 6,333,461 B1 * | 12/2001 | Marcou et al. | 174/68.3 |
| 6,380,484 B1 * | 4/2002 | Theis et al. | 174/68.3 |
| 6,437,244 B1 * | 8/2002 | Vander Velde | 174/68.3 |
| 6,756,544 B2 * | 6/2004 | Handler | 174/68.1 |
| 6,835,891 B1 * | 12/2004 | Herzog et al. | 174/66 |
| 6,903,265 B1 * | 6/2005 | VanderVelde et al. | 174/481 |
| D511,143 S * | 11/2005 | Diatschenko et al. | D13/153 |
| 7,071,418 B2 * | 7/2006 | Brockman et al. | 174/154 |
| 2002/0174525 A1 | 11/2002 | Pedersen | |

FOREIGN PATENT DOCUMENTS

| | | |
|---|---|---|
| EP | 1162709 A1 | 12/2001 |
| JP | 08042755 A | 2/1996 |
| JP | 07071655 A | 3/1996 |
| JP | 2002022064 A | 1/2002 |

* cited by examiner

DEVICE FOR RECEIVING OBLONG OBJECTS

The invention relates to a device for receiving elongated objects, in particular, electrical lines and/or fluid lines.

Such devices, which usually exhibit a receiving element with a bottom wall and two bordering walls as well as a cover element mounted in pivoting fashion on the receiving element, are used, for example, in the automobile industry in order to lay electrical lines in a particular way. In that regard, the lines are placed into the receiving element, and after the cover element is closed, they are held securely in the device. While elongated objects can be held securely and guided by the previously known devices, they are usually designed for a specific mounting environment and therefore they can be used in a different mounting environment either not at all or only with frequently unwanted disadvantages.

The invention is based on the task of suggesting a device for receiving elongated objects that is distinguished by a certain variability in its mounting options.

According to the invention, this task is solved with a device for receiving elongated objects, in particular, electrical lines and/or fluid lines, having a bottom wall and a receiving element having two bordering walls that face each other, and a cover element that is mounted on the receiving element so as to be pivoted by means of a border hinge and that can be linked with the receiving element by means of a closure system facing the border hinge, whereby the cover element has at least three cover sections, whereby a center hinge is configured between adjacent cover sections and whereby the closure system allows for a number of closure positions, corresponding to the number of center hinges, in which the cover sections are spaced at different distances from the bottom wall.

As a result of the fact that the inventive device cover element has a number of cover sections that are linked to each other by means of center hinges, and that the closure system allows for a number of closure positions, corresponding to the number of center hinges, in which the cover element is away from the bottom wall at different distances, the device can be used in a variety of mounting environments that require different line receiving capacities and/or installation heights.

In the case of a purposeful further development of an inventive device, present on the cover sections is an inhibiting system by means of which two adjacent cover sections are inhibited in a locked position in their movement relative to one another. As a result, the cover element is stabilized against loads acting in the direction toward the bottom wall.

In a purposeful version of the last-named further development, the inhibiting system has a number of ribs that are arranged in the cover sections and, in one locked position each, are arranged with their faces that point towards each other lying against each other. Advantageously, this version is very easy to produce.

In another purposeful further development of an inventive device, formed onto the cover section that lies furthest from the border hinge is a side border segment which is aligned at an angle, preferably a right-angle, to this cover section and on which closure parts of the closure system are arranged that interact with closure counterparts of the closure system that are configured on a bordering wall. As a result, an easily produced and stable link between the receiving element and the cover element is achieved.

In a purposeful version of the last-named further development, the closure counterparts are formed in the front border area and in the bottom wall side border area of the bordering wall. In these two locked positions, the maximum or minimum installation height and receiving capacity are allowed.

Figure 2:
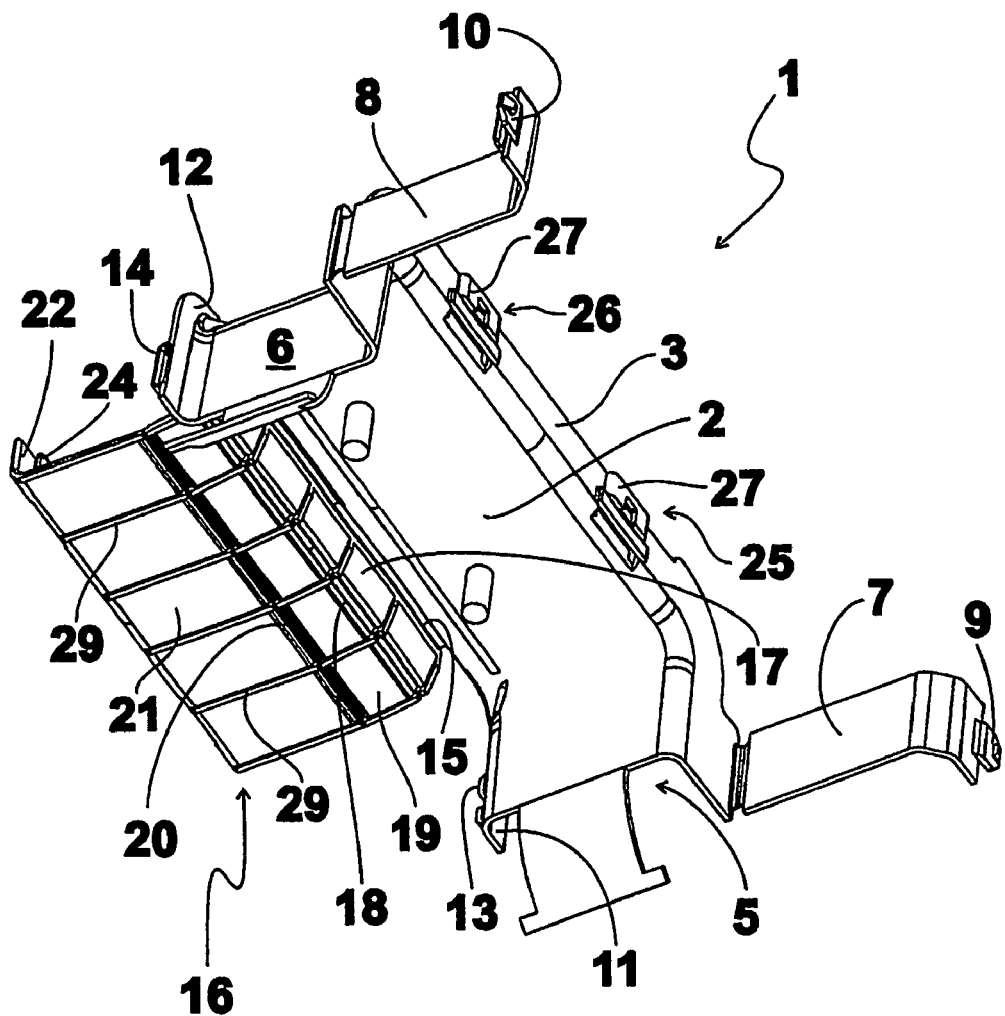
Figure 3:
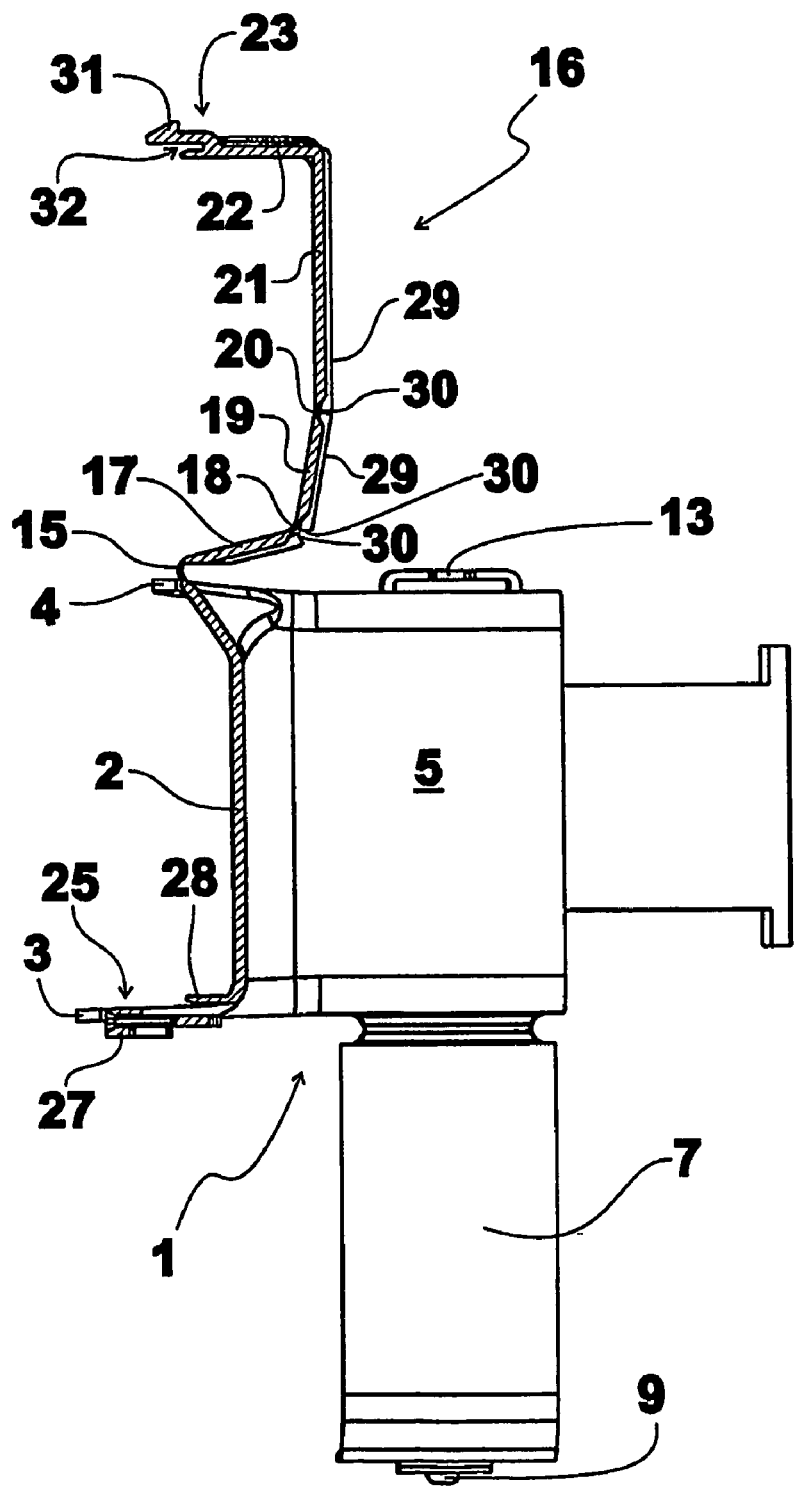
Figure 4:
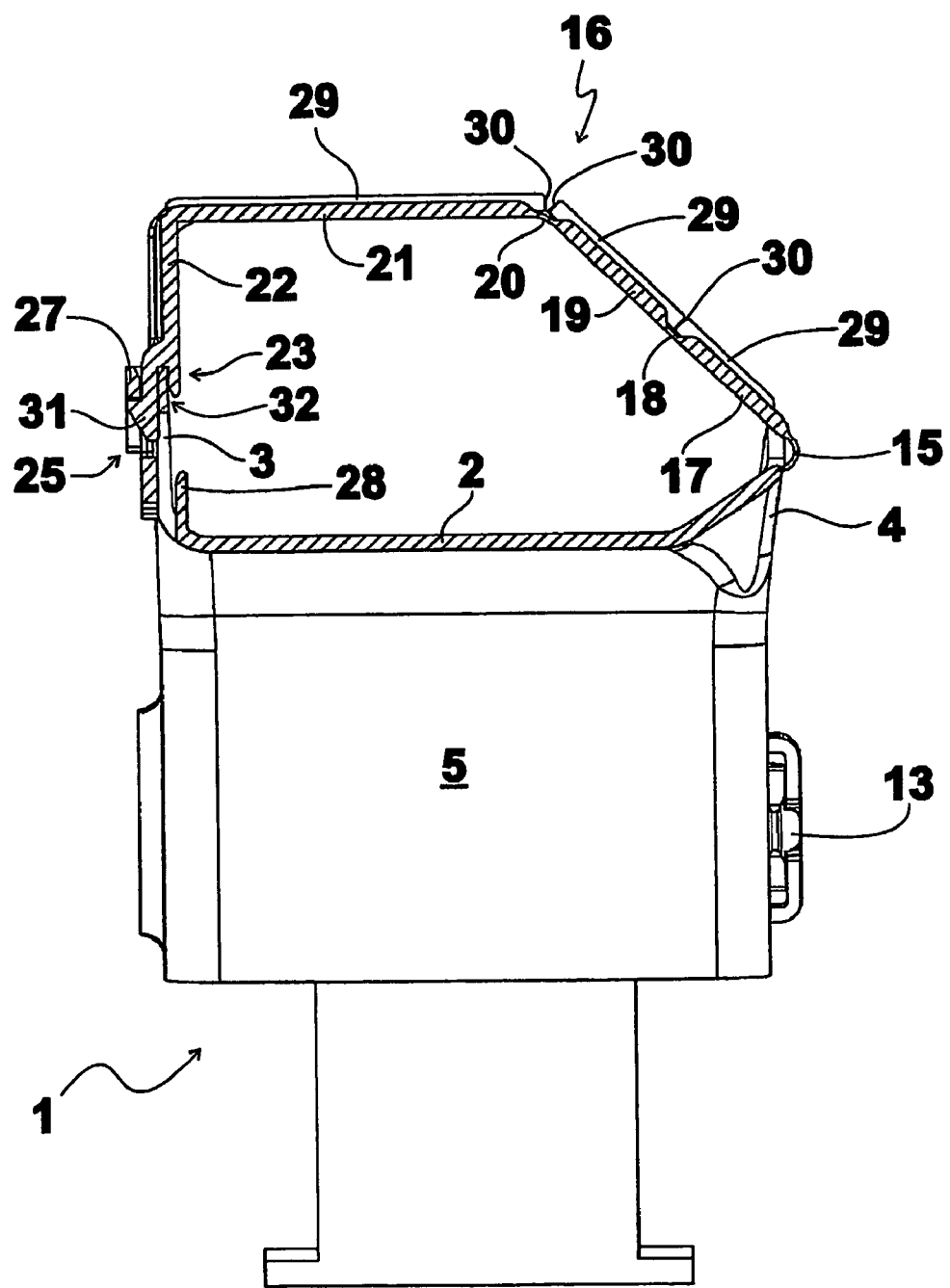
Figure 5:
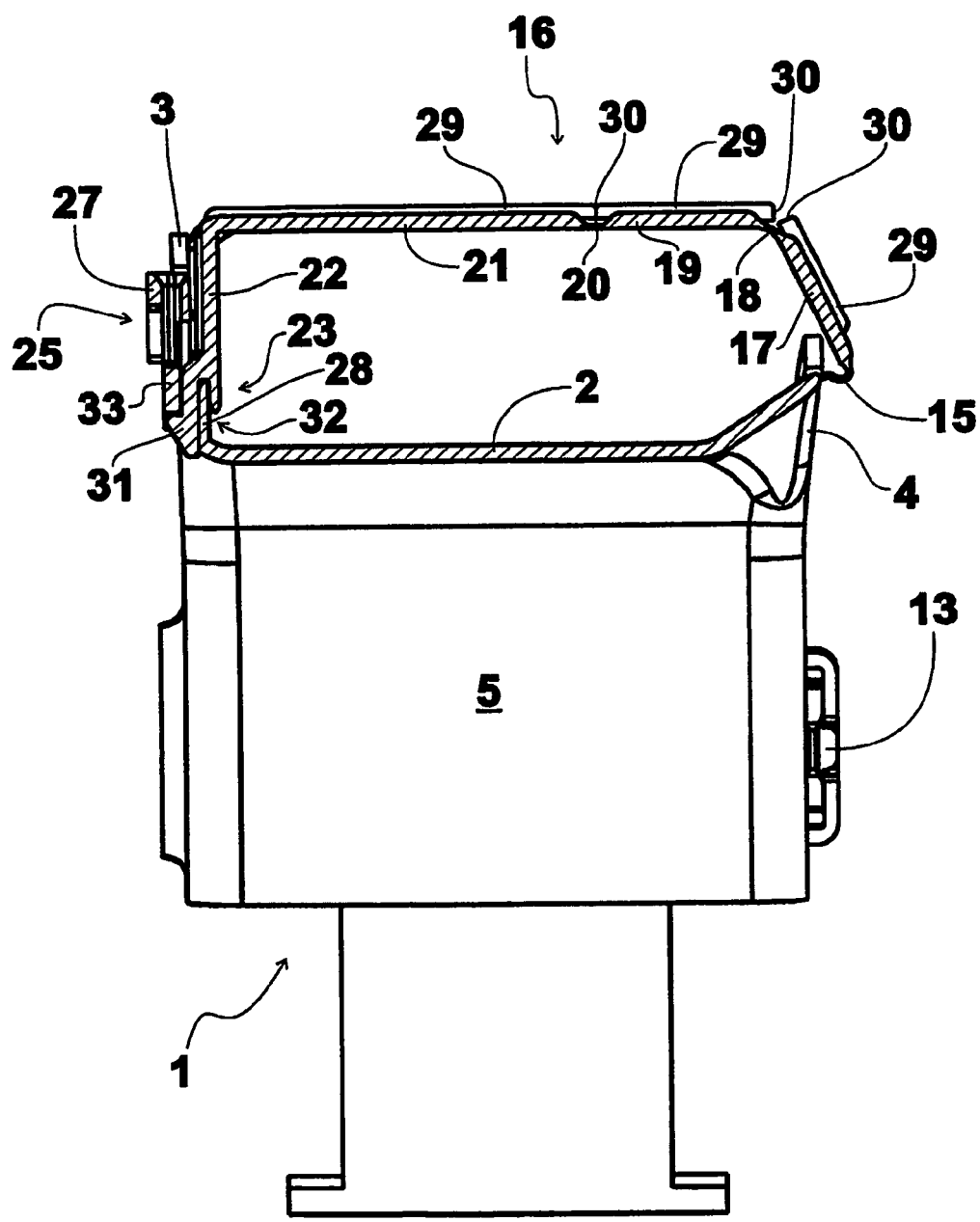

Further purposeful designs and advantages result from the following description of a preferred embodiment of the invention, including references to the Figures of the drawing. Shown are:

FIG. 1 A perspective view of an embodiment of an inventive device with an open cover element looking in the insertion direction of objects onto a bottom wall of a receiving element, FIG. 2 A perspective view of the embodiment according to FIG. 1 looking opposite the insertion direction of objects, FIG. 3 The embodiment according to FIGS. 1 and 2 in a section in the transverse direction through the receiving element and the cover element with the cover element open, FIG. 4 The embodiment in the illustration according to FIG. 3, with the cover element in a first locked position, and FIG. 5 The embodiment in the illustration according to FIG. 3 with the cover element in a second locked position.

FIG. 1 shows a perspective view of an embodiment of an inventive device with bridge-like receiving element 1 that is configured as a cable channel and that has a flat, in this embodiment rectangular, bottom wall 2. Affixed on the outside borders of the bottom wall 2 are a first bordering wall 3 and a second bordering wall 4, which are in essence aligned at a right angle to the bottom wall 2 and extend in the longitudinal direction of the bottom wall 2.

Appended on the transverse sides of the bottom wall 2 are two flat side walls 5, 6 that extend in the same direction at essentially a right angle to the bottom wall 2. The first bordering wall 3 extends along the respective outside border of the side walls 5, 6. Formed onto the segments of the first bordering wall 3 that lie in the region of the side walls 5, 6 are side covers 7, 8 which can pivot by means of hinges and which are configured with latching tongues 9, 10 on their free ends that are bent by approximately 90 degrees to a larger flat segment. Opposite the first bordering wall 3, formed onto the borders of the side walls 5, 6 and at a right angle to them are webs 11, 12, which have tongue receivers 13, 14 into which the latching tongues 9, 10 can be inserted.

Formed onto the second bordering wall 4 is a cover element 16, which can pivot relative to the receiving element 1 by means of a border hinge 15 that extends over most of the length of the bottom wall 2, and which in the illustrated embodiment has a first cover section 17 that is connected with the border hinge 15, a second cover section 19 that is connected with the first cover section 17 by means of a first center hinge 18, and a third cover section 21 that is connected with the second cover section 19 by means of a second center hinge 20. The border hinge 15 and the center hinges 18, 20 are designed as so-called living hinges with a relative thin cross section.

Formed onto the third cover section 21 at essentially a right angle to the longitudinal side facing away from the second center hinge 19 is a side border section 22, configured onto the front side of which that points away from the third cover section 21 in the illustrated embodiment are a first closure part 23 and a second closure part 24 of a closure system.

Present on the first bordering wall 3 at the level of the closure parts 23, 24 in the longitudinal direction of the bottom wall 2 are a first closure counterpart 25 and a second closure counterpart 26 of the closure system, each of which has an outside closure receiver 27 pointing away from the second bordering wall 4 and a support rib 28 facing the second bordering wall 4.

It can be seen in FIG. 1 that a cable, not shown, or other elongated objects can be inserted into this receiving element 1 between the bordering walls 3, 4 and the webs 11, 12 in an insertion direction, e.g., from above in the illustration according to FIG. 1, and the elongated objects are held after the side covers 7, 8 and the cover element 16 are closed, as is explained in more detail below.

FIG. 2 shows a perspective view of the embodiment according to FIG. 1 looking opposite the insertion direction of the objects. It can be seen in FIG. 2 that configured onto the outsides of the cover sections 17, 19, 21 are a number of ribs 29 of an inhibiting system that extend at essentially a right angle to the center hinges 18, 20, whereby each rib 29 of a cover section 17, 19, 21 is aligned with an opposite rib 29 of an adjacent cover section 17, 19, 21.

FIG. 3 shows the embodiment according to FIGS. 1 and 2 in a section in the transverse direction through the receiving element 1 and the cover element 16 with the cover element 16 open. It can be seen in FIG. 3 that with an angled alignment of the cover sections 17, 19, 21 relative to each other, front faces 30 that point towards each other are at a distance from ribs 29 that are opposite, while they lie against each other with an arrangement of cover sections 17, 19, 21 that is at a flat angle or level, so that as a result, within the limits of the material properties of the ribs 29, a further relative pivoting movement of adjacent cover sections 17, 19, 21 is at least inhibited, or even in essence completely blocked.

When the front faces 30 are aligned at a right angle to the longitudinal direction of the ribs 29, the inhibiting action commences at an angle of 180 degrees, while when the front faces are aligned in opposing directions diagonally to the longitudinal direction of the ribs 29, depending on the orientation of the diagonals the inhibiting effect already commences at an angle of less than 180 degrees or only at an angle of more than 180 degrees.

It can also be seen in FIG. 3 that the identically designed closure parts 23, 24 have a protruding latching lug 31 and a support groove 32.

FIG. 4 shows the embodiment in the illustration according to FIG. 3, with the cover element 16 in a first locked position in which the upper border of the first bordering wall 3 engages in the support grooves 32 and the latching lugs 31 grip behind the outside closure receivers 27. It can be seen in FIG. 4 that in the first locked position, with a most convex distance of the third cover section 21 from the bottom wall 2, as a result of the correspondingly adjusted width of the first cover section 17 and the second cover section 19 and the essentially right-angle alignment of the front faces 30 to the longitudinal direction of the ribs 29, the first cover section 17 and the second cover section 19 essentially lie in one plane, and in this alignment, as a result of the inhibiting system formed by the ribs 29 they are able to resist the forces acting in the direction of the bottom wall 2.

FIG. 5 shows the embodiment in the illustration according to FIG. 3 with the cover element 16 in a second locked position, in which the support ribs 28 engage in the support grooves 32, while the latching lugs 31 engage behind inside closure receivers 33, of the closure counterparts 25, 26, that are opposite the outside closure receivers 27. In FIG. 5, it can be seen that in the second locked position with the closest adjacent arrangement of the third cover section 21 to the bottom wall 2, as a result of the correspondingly adjusted width of the second cover section 19 and the third cover section 21 and the essentially right-angle alignment of the front faces 30 to the longitudinal direction of the ribs 29, the second cover section 19 and the third cover section 21 essentially lie in one plane, and in this alignment, as a result of the inhibiting system formed by the ribs 29 they are able to resist the forces acting in the direction of the bottom wall 2.

It thus can be seen from FIG. 4 and FIG. 5 that with the embodiment, the greater installation height and the greater receiving capacity is optionally available in the first locked position, while the smaller installation height with the smaller receiving capacity is taken up in the second locked position.

The invention claimed is:

1. Device for receiving elongated objects, in particular, electrical lines and/or fluid lines, comprising
a bottom wall (2) and
a receiving element (1) having two bordering walls (3, 4) facing each other, and
a cover element (16) that is mounted on the receiving element (1) so as to be pivoted by means of a border hinge (15) and that can be linked with the receiving element (1) by means of a closure system (23, 24, 25, 26) facing the border hinge (15),
whereby the cover element (16) has at least three cover sections (17, 19, 21) and whereby the closure system (23, 24, 25, 26) allows for a number of closure positions, corresponding to the number of center hinges (18, 20), in which the cover sections (17, 19, 21) are spaced at different distances from the bottom wall wherein the cover section have a first closure position in which only a first pair of the three cover sections is fixed in a single plane, the cover sections having a second closure position in which only a second, different pair of the three cover sections is fixed in a single plane (2).

2. Device according to claim 1, whereby present on the cover sections (17, 19, 21) is an inhibiting system (29) by means of which two adjacent cover sections (17, 19, 21) are held in a locked position in their movement relative to one another.

3. Device according to claim 2, whereby the inhibiting system has a number of ribs (29) that are arranged in the cover sections (17, 19, 21), the ribs (29) having faces (30) that point towards one another and that are engageable with one another to hold the cover sections (17, 19, 21) in the locked position.

4. Device according to claim 1, whereby formed onto the cover section (21) that lies furthest from the border hinge (15), is a side border section (22) that is aligned at an angle, to this cover section (21), on which are configured closure parts (23, 24) of the closure system that interact with closure counterparts (25, 26) of the closure system that are configured on a bordering wall.

5. Device according to claim 4, whereby each closure counterpart (25, 26) is configured in the bordering wall (3) and includes a first portion (27) facing away from the bordering wall (4) and a second portion (28) facing towards the bordering wall (4).

6. Device according to claim 2, whereby formed onto the cover section (21) that lies furthest from the border hinge (15), is a side border section (22) that is aligned at an angle to this cover section (21), on which are configured closure parts (23, 24) of the closure system that interact with closure counterparts (25, 26) of the closure system that are configured on a bordering wall.

7. Device according to claim 3, whereby formed onto the cover section (21) that lies furthest from the border hinge (15), is a side border section (22) that is aligned at an angle to this cover section (21), on which are configured closure parts (23, 24) of the closure system that interact with closure counterparts (25, 26) of the closure system that are configured on a bordering wall.

8. Device according to claim 6, wherein the side border section (22) is aligned at a right angle to the cover section (21).

9. Device according to claim 7, wherein the side border section (22) is aligned at a right angle to the cover section (21).

10. Device according to claim 1, wherein the closure system includes a closure part (23) that is engageable with a closure receiver (27) of the closure system (25) to place the cover sections (17, 19, 21) in a first closure position and is engageable with a supporting rib (28) of the closure system (25) to place the cover sections (17, 19, 21) in a second closure position different from the first closure position.

11. Device according to claim 10, wherein the closure receiver (27) points away from the wall (4) and the support rib (28) faces the wall (4).

12. Device according to claim 10, wherein the closure part (23) engages a closure receiver (33) and the supporting rib (28) of the closure system (25) to place the cover sections (17, 19, 21) in the second closure position.

13. Device according to claim 1, wherein the number of closure positions of the cover sections (17, 19, 21) is limited to the number of center hinges.

14. Device according to claim 1, wherein the bottom wall (2), bordering walls (3, 4), and cover element (16) cooperate to define a cable channel, the cable channel having a different cross-section for each of the locked closure positions.

15. Device according to claim 1, wherein the bottom wall, bordering walls, and cover element cooperate to define a cable channel, the cable channel having a different cross-section for each of the locked closure positions.

16. A device for receiving elongated objects comprising:
a bottom wall from which first and second bordering walls extend;
a cover element pivotably mounted to the first bordering wall, the cover element having a plurality of cover sections and at least one closure part; and
a closure system associated with each of the closure parts, each closure system comprising a first closure receiver positioned at a first location on the second bordering wall and a second closure receiver positioned at a second, different location on the second bordering wall, the closure part being engageble with the first closure receiver to hold the cover sections in a first locked configuration, the closure part being engageble with the second closure receiver to hold the cover sections in a second locked configuration different from the first locked configuration wherein the plurality of cover sections comprises three cover sections, wherein only a first pair of the three cover sections is locked in a co-planar configuration when the closure part is engaged with the first closure receiver and only a second, different pair of the three cover sections is locked in a co-planar configuration when the closure part is engaged with the second closure receiver.

17. The device according to claim 16, wherein the cover element includes a plurality of ribs having faces that point towards one another and that are engageable with one another to hold the cover sections in the locked closure configurations.

18. The device according to claim 16, wherein the bottom wall, bordering walls, and cover element cooperate to define a cable channel, the cable channel having a different cross-section for each of the locked closure configurations.

* * * * *